(12) United States Patent
Slate et al.

(10) Patent No.: US 10,940,905 B2
(45) Date of Patent: Mar. 9, 2021

(54) BICYCLE SADDLE WITH THROUGH-HOLE HANDLE

(71) Applicants: Mark J. Slate, San Rafael, CA (US); Patrick M. Seidler, San Rafael, CA (US); Raphael Schlanger, Wilton, CT (US)

(72) Inventors: Mark J. Slate, San Rafael, CA (US); Patrick M. Seidler, San Rafael, CA (US); Raphael Schlanger, Wilton, CT (US)

( * ) Notice: Subject to any disclaimer, the term of this patent is extended or adjusted under 35 U.S.C. 154(b) by 0 days.

(21) Appl. No.: 16/572,836

(22) Filed: Sep. 17, 2019

(65) Prior Publication Data

US 2020/0094899 A1 Mar. 26, 2020

Related U.S. Application Data

(60) Provisional application No. 62/733,826, filed on Sep. 20, 2018.

(51) Int. Cl.
*B60N 2/40* (2006.01)
*A47C 7/62* (2006.01)
(Continued)

(52) U.S. Cl.
CPC .............. *B62J 1/002* (2013.01); *B62J 1/007* (2013.01); *B62J 1/02* (2013.01); *B62J 1/18* (2013.01)

(58) Field of Classification Search
CPC ..... B62J 1/002; B62J 1/007; B62J 1/02; B62J 1/18
(Continued)

(56) References Cited

U.S. PATENT DOCUMENTS

| 499,244 A | 6/1893 | Naly | |
| 567,634 A * | 9/1896 | Barler | B62J 1/002 |
| | | | 297/202 |

(Continued)

FOREIGN PATENT DOCUMENTS

| DE | 102012005574 B4 | 10/2013 |
| WO | WO2007/038692 A2 | 4/2007 |
| WO | WO2015007622 A1 | 1/2015 |

OTHER PUBLICATIONS

Selle Royal E Zone Saddles', Jul. 27, 2018. [retrieved on Oct. 13, 2019]. Retrieved from the Internet: <https://www.amazon.com/Selle-Royal-E-Zone-Saddles/dp/B07TTVK8D7>.

(Continued)

*Primary Examiner* — Rodney B White
(74) *Attorney, Agent, or Firm* — Michael A. Blake

(57) ABSTRACT

A seat for a bicycle comprising: a seating surface having a longitudinal length, a longitudinally forward portion, a longitudinally rearward portion, and a lateral width between a first lateral end and a second lateral end laterally opposed to the first lateral end; an underside surface below the seating surface; an opening extending through the seating surface and the underside surface; where the opening has an opening length between a longitudinally forward periphery and a longitudinally rearward periphery and an opening width between a first lateral periphery and a second lateral periphery laterally opposed to the first lateral periphery; where the seating surface includes a bridge portion longitudinally located between the opening and the rearward portion of the seating surface; and where the opening has a lateral width greater than its longitudinal length.

21 Claims, 9 Drawing Sheets

(51) Int. Cl.
*B62J 1/00* (2006.01)
*B62J 1/18* (2006.01)
*B62J 1/02* (2006.01)

(58) Field of Classification Search
USPC .................. 297/201, 202, 214, 183.1, 183.6
See application file for complete search history.

(56) References Cited

U.S. PATENT DOCUMENTS

| | | | |
|---|---|---|---|
| 612,972 A | 10/1898 | Leech | |
| 628,704 A * | 7/1899 | Gates | B62J 1/002 |
| | | | 297/202 |
| 872,124 A | 11/1907 | Hammaren | |
| 1,975,405 A * | 10/1934 | Pryale | B62J 1/00 |
| | | | 297/215.16 |
| 4,218,090 A * | 8/1980 | Hoffacker | B62J 1/22 |
| | | | 297/202 |
| 4,768,826 A | 9/1988 | Kashima | |
| 5,348,369 A * | 9/1994 | Yu | B62J 1/00 |
| | | | 297/214 X |
| 5,388,887 A * | 2/1995 | Read | B62J 1/00 |
| | | | 297/214 X |
| 5,714,108 A * | 2/1998 | Girardi | B29C 44/027 |
| | | | 156/85 |
| 6,095,601 A * | 8/2000 | Yu | B62J 1/00 |
| | | | 297/202 |
| 6,106,059 A | 8/2000 | Minkow et al. | |
| 6,322,139 B1 * | 11/2001 | Chuang | B62J 1/002 |
| | | | 297/202 X |
| 6,402,236 B1 | 6/2002 | Yates | |
| 6,976,736 B2 * | 12/2005 | Yu | B62J 1/00 |
| | | | 297/215.16 |
| 7,478,872 B2 * | 1/2009 | Lee | B62J 1/00 |
| | | | 297/214 X |
| 7,717,505 B2 * | 5/2010 | Yu | B62J 1/00 |
| | | | 297/202 |
| 9,039,082 B2 * | 5/2015 | Truglio | B62J 1/22 |
| | | | 297/202 |
| 9,132,874 B2 * | 9/2015 | Sam | B62J 1/22 |
| 9,233,725 B2 | 1/2016 | Marcel | |
| 9,359,031 B2 * | 6/2016 | Rizzato | B62J 1/18 |
| D760,507 S | 7/2016 | Marcel | |
| D764,820 S | 8/2016 | Toll | |
| 9,446,808 B2 | 9/2016 | Marui | |
| 9,718,509 B2 | 8/2017 | Toll | |
| 9,738,340 B2 * | 8/2017 | Yu | B62J 1/02 |
| 9,764,788 B1 | 9/2017 | Sung | |
| 2004/0195871 A1 * | 10/2004 | Lee | B62J 1/00 |
| | | | 297/214 |
| 2006/0255631 A1 | 11/2006 | Ljubich | |
| 2008/0122271 A1 | 5/2008 | Bigolin | |
| 2009/0079237 A1 | 3/2009 | Riondato | |
| 2013/0313870 A1 | 11/2013 | Riondato | |
| 2014/0145479 A1 | 5/2014 | Li | |
| 2015/0175228 A1 * | 6/2015 | Yu | B62J 1/005 |
| | | | 297/202 |
| 2016/0137245 A1 | 5/2016 | Schiavon | |
| 2016/0144914 A1 | 5/2016 | Jay | |
| 2017/0274950 A1 | 9/2017 | Holt | |

OTHER PUBLICATIONS

PCT/US19/52057, International Search Report, dated Dec. 6, 2019, Shane Thomas.

* cited by examiner

BICYCLE SADDLE WITH THROUGH-HOLE HANDLE

CROSS-REFERENCES

This patent application claims the benefit of U.S. Provisional Patent Application No. 62/733,826 by inventors Mark J. Slate and Patrick M. Seidler entitled "BICYCLE SADDLE WITH THROUGH-HOLE HANDLE", filed on Sep. 20, 2018, and which provisional application is fully incorporated by reference herein.

TECHNICAL FIELD

The present invention relates to bicycle saddles, and more specifically to a bicycle saddle with a through-hole that a user can use as a handle for lifting the bicycle.

BACKGROUND

E-bikes and Packbikes are heavier than standard bicycles and more challenging to lift. Standard bikes for off-road use have also gotten heavier due to suspension, tire size and strength concerns. Lifting bicycles to go upstairs or over obstacles that cannot be ridden requires a place to hold on to the bicycle while lifting the bicycle. Many use the rear of a saddle on the bicycle as a place to lift the bicycle. However, space on the rear of saddles is limited, and may be uncomfortable for the user to lift the bicycle. When hands are cold or wet, a secure grip can be a challenge on the rear edge of a bicycle saddle. In addition, lifting the bicycle on the rear edge of a saddle may be awkward and difficult. Particularly for heavier bicycles, there is a need for an effectively placed and ergonomic handle for the user to grasp when lifting and/or maneuvering the bicycle. The wide rear portion of the seat area is a natural location for such a handle. Conventional seats or saddles have not heretofore included facility for such a handle. While some seats have openings, the opening is intended to provide clearance for soft tissue of the rider while seated on the saddle and is not of a shape intended for manual grasping. Disadvantages of prior-art openings include: openings are aligned longitudinally and do not have the lateral width to accommodate multiple fingers; single finger access does not have sufficient strength to lift and or maneuver bike; openings are also too far forward of the rearward end of the seat, such that any bridge portion has excessive longitudinal length and/or insufficient lateral width to be easily grasped by a normal-sized hand; some prior-art seats include a handle external to the seating area of the seat, either behind the seat area or below the seat area. Disadvantages of prior-art seat handles include: rearward location of handle makes lifting the bicycle in an unbalanced state; not enough clearance for fingers to wrap around handle for a firm grip; position of handle below seat is not ergonomic. A handle added outside of the standard seating area may hinder normal ride use, particularly when the rider is mounting and/or dismounting the seat.

Building a handle or a more pronounced ledge on the rear of a saddle has been done. However, the aesthetic appeal of the saddle is greatly reduced by adding a pronounced ledge or an extending handle to the saddle.

FIG. 1 shows a prior art saddle. FIG. 1 describes a generally generic configuration of an exemplary seat 3, as well as a description of the direction conventions used throughout this disclosure. For clarity, the bicycle frame is not shown in this figure.

The seat 3 has a seating surface 5 intended to provide seating contact with the rider. The seat 3 also has a longitudinal axis 7 that extends between the forward end 12 and rearward end 14 of the seat 3, a lateral axis 9 that extends between lateral ends 16a and 16b, and a depth axis 10 extending generally perpendicular to the seating surface 5. The terms "seat" and "saddle" are equivalent and interchangeable throughout this disclosure.

The forward direction 18 and rearward direction 19 are directions along the longitudinal axis 7. A forward orientation is a relative orientation along the longitudinal axis 7 in the forward direction 18 and distal the rearward end 14 and a rearward orientation is a relative orientation along the longitudinal axis 7 in the rearward direction 19 and distal the forward end 12. The lateral directions 20a and 20b are directions along the lateral axis 9, with a laterally inward orientation proximal to the midpoint between lateral ends 16a and 16b and a laterally outward orientation distal to this midpoint. The upward or raised direction 22 and the downward or lowered direction 24 extend along the depth axis 10.

The seat is commonly mounted to a seatpost 26, which in turn is mounted to the frame of the bicycle (not shown) in the conventional manner. It is most common that the seat 3 includes seat rails (not shown) and the seatpost 26 includes facility (not shown) for connecting to the seat rails. There are also a wide range of alternate means for connecting the seat to the seatpost 26 or to the bicycle.

There is a need for a bicycle saddle that overcomes the above listed and other disadvantages.

SUMMARY OF THE INVENTION

The invention relates to a seat for a bicycle comprising: a seating surface having a longitudinal length, a longitudinally forward portion, a longitudinally rearward portion, and a lateral width between a first lateral end and a second lateral end laterally opposed to the first lateral end; an underside surface below the seating surface; an opening extending through the seating surface and the underside surface; where the opening has an opening length between a longitudinally forward periphery and a longitudinally rearward periphery and an opening width between a first lateral periphery and a second lateral periphery laterally opposed to the first lateral periphery; where the seating surface includes a bridge portion longitudinally located between the opening and the rearward portion of the seating surface; and where the opening has a lateral width greater than its longitudinal length.

BRIEF DESCRIPTION OF THE DRAWINGS

The present disclosure will be better understood by those skilled in the pertinent art by referencing the accompanying drawings, where like elements are numbered alike in the several figures, in which:

FIG. 2b is an orthogonal top view of the embodiment of FIG. 2a;

FIG. 2d is an orthogonal side view of the embodiment of FIG. 2a;

FIG. 2e is an orthogonal bottom view of the embodiment of FIG. 2a;

FIG. 6b is a bottom perspective view of the bicycle saddle from FIG. 6a;

FIG. 6c is a top view of the saddle from FIG. 6a;

FIG. 6d is a bottom view of the saddle from FIG. 6a;

FIG. 6e is a side view of the saddle from FIG. 6a; and

DETAILED DESCRIPTION OF THE INVENTION

Figure 1:
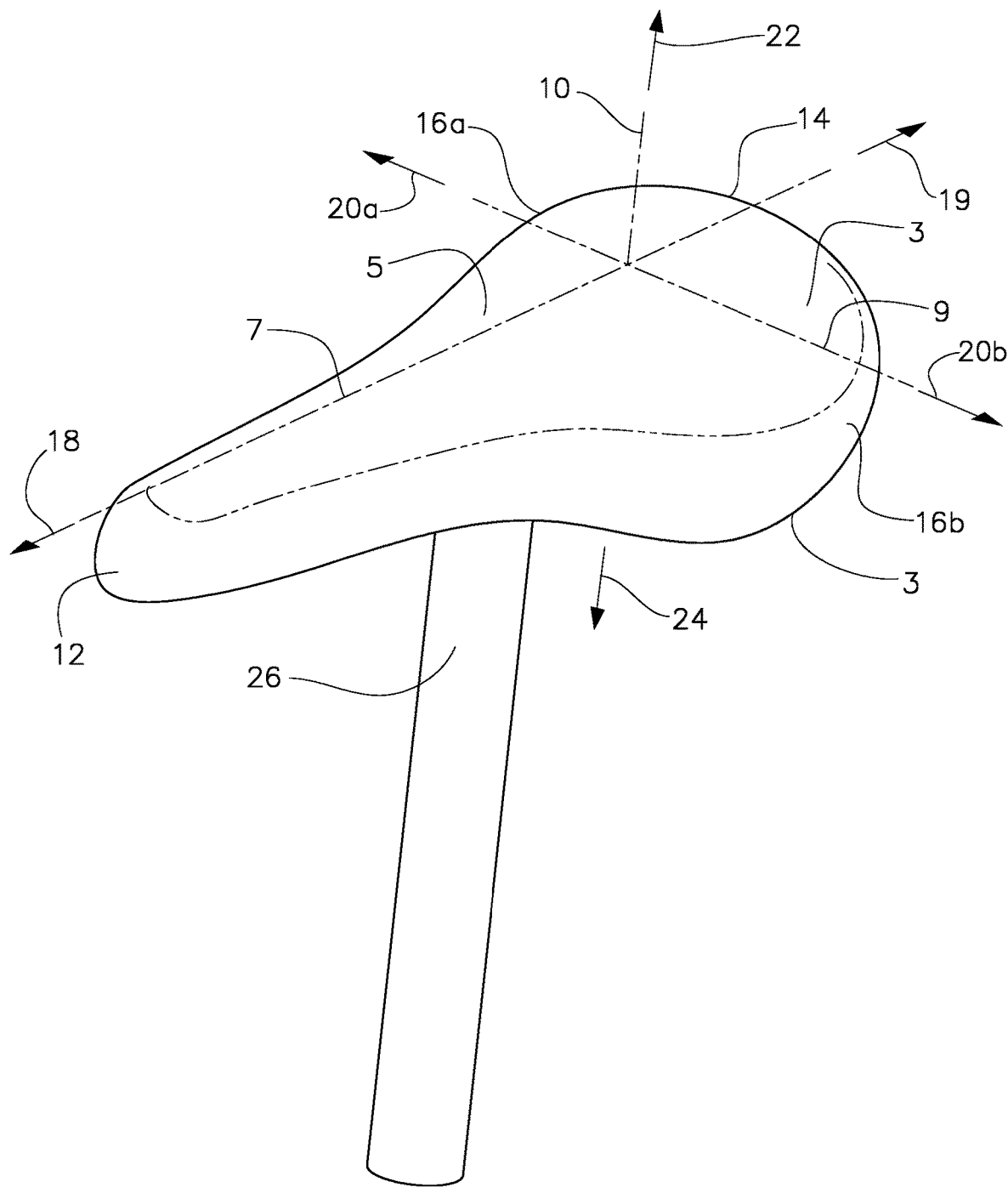
FIG. 1 is a perspective view of a prior art bicycle seat and seatpost, schematically illustrating the general configuration, including description of the generic directions and orientations utilized throughout the specification.

With a hole through a bicycle saddle shape and with a stronger base construction the disclosed saddle with through-hole handle can still look much the same when viewed from the side or back of the saddle. In the disclosed saddle, a handle grip area is accomplished by configuring a hole through the rear part of a bicycle saddle that can still be used for seating. In fact the area immediately surrounding the hole through the saddle is padded and still serves to support rider weight.

With a hole though the useful seating area of the saddle, the grip for a user's hand can be quite secure. Also, the grip position is further forward than other known saddles that position the user's grip rearward of the seating surface. This helps with the control of the bike weight when lifting. The hole through the saddle provides hand positioning that is constrained, both laterally and longitudinally. In other words, the grip of the hand of the user cannot slip to the side or be forced forward or rearwards as readily as other solutions without a 360 degree enclosing containment of the hand and/or fingers.

The disclosed saddle has a through-hole grasping position that is further forward than the rear end of the saddle, which helps to balance the weight bias of the bicycle when lifting or pushing the bike over obstacles. In addition, the bicycle saddle maintains an aesthetically pleasing appearance. The aesthetic appearance of a bicycle, and especially a saddle, is important to enthusiasts and sales people. The usefulness of a hole through the seating area as a handle increases control when grasping—without compromising the seating comfort or in any way detracting from the current usefulness of a bicycle saddle and without adding additional weight.

In order to have a saddle with this through-hole, accommodations need to be made to the bicycle saddle. The saddle rails (the supporting frame that secures the saddle to a standard seat post) are preferably wider at the rear socket joining position than normal in order to allow enough space for fingers with gloves. Ideally four fingers should fit through the through-hole without undue constraint, and for bigger hands, three fingers may fit through the through-hole. The saddle base needs to be strengthened to support force in an upwards direction not normally needed if the bike is not being lifted from the rear of the saddle. The padding area surrounding the hole through needs to be properly configured and covered to withstand wear and tear from grit and grime common to off-road bicycle use. Yet with these changes, the saddle will maintain an aesthetically pleasing look.

The novel saddle arrangement described herein maintains a comfortable seating surface that does not significantly detract from the comfort of the rider. The opening is positioned outside of and/or between the region of the seating surface that supports the rider's sit-bones and does not interfere with support and/or comfort of the rider. Further, the padding in the bridge area provides resilient cushioning surrounding grab handle for comfort during sitting.

The present invention provides a grab handle/bar that is longitudinally forward of the rear edge of seat for improved balance of the bicycle when the bicycle is raised lifted off the ground by grasping the saddle through the opening. This grab handle/bar is longitudinally inward of the rear of seat to help with the control of the bike weight when lifting. Because grip location is closer to the balance point of the bicycle and reduces pitching of the bicycle when it is lifted off the ground.

The present invention provides a grab handle (i.e. bridge) of sufficient lateral width to be gripped by at least two fingers, while maintaining resilient padding at the upper surface of the bridge portion. Further, the lateral opening is better than the prior art longitudinal opening because this allows the bridge to extend in a direction generally perpendicular to longitudinal axis, which provides a more ergonomic grab bar and which provides better control of the lateral tilt of bicycle when it is off the ground.

FIGS. 2a-e describe a first embodiment of the present invention. The seat 30 has a seating surface 32 intended to provide seating contact with the rider. The seat 3 also has a longitudinal axis 7 that extends between the forward end 34 and rearward end 36 of the seat 30, a lateral axis 9 that extends between lateral ends 38a and 38b, and a depth axis 10 extending generally perpendicular to the seating surface 32.

The seating surface 32 is defined herein as the generally upwardly facing surface of the seat 30 that faces the user while he/she is sitting on the seat 30. At least a portion the seating surface 32 is in direct contact with the user to support the user while he/she is sitting on the seat 30. However, certain portions of the seating surface 32 may be relieved to be spaced from the direct contact with the user, with a gap therebetween. Further, certain portions of the seating surface 32 may extend beyond or outside of the region of direct contact with the user while he/she is sitting on the seat 30. The seat 30 has an overall longitudinal length 50 between forward end 34 and rearward end 36 and an overall lateral width 51 between lateral ends 38a and 38b. It is noted that lateral ends 38a and 38b are longitudinally positioned to be longitudinally rearward of the midpoint of the longitudinal length 50 as is ergonomic and common for bicycle seat configuration.

Figure 2A:
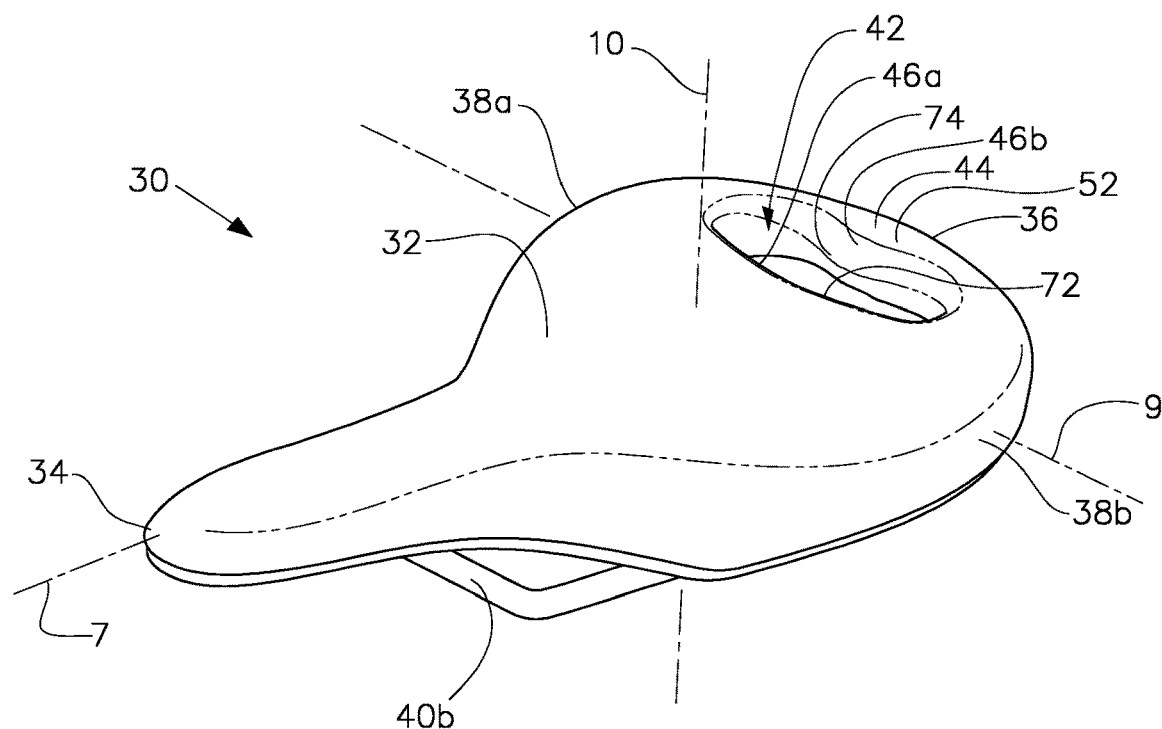
FIG. 2a is a perspective view of a first embodiment of the present invention, showing the seat with an opening therein.
Figure 2B:
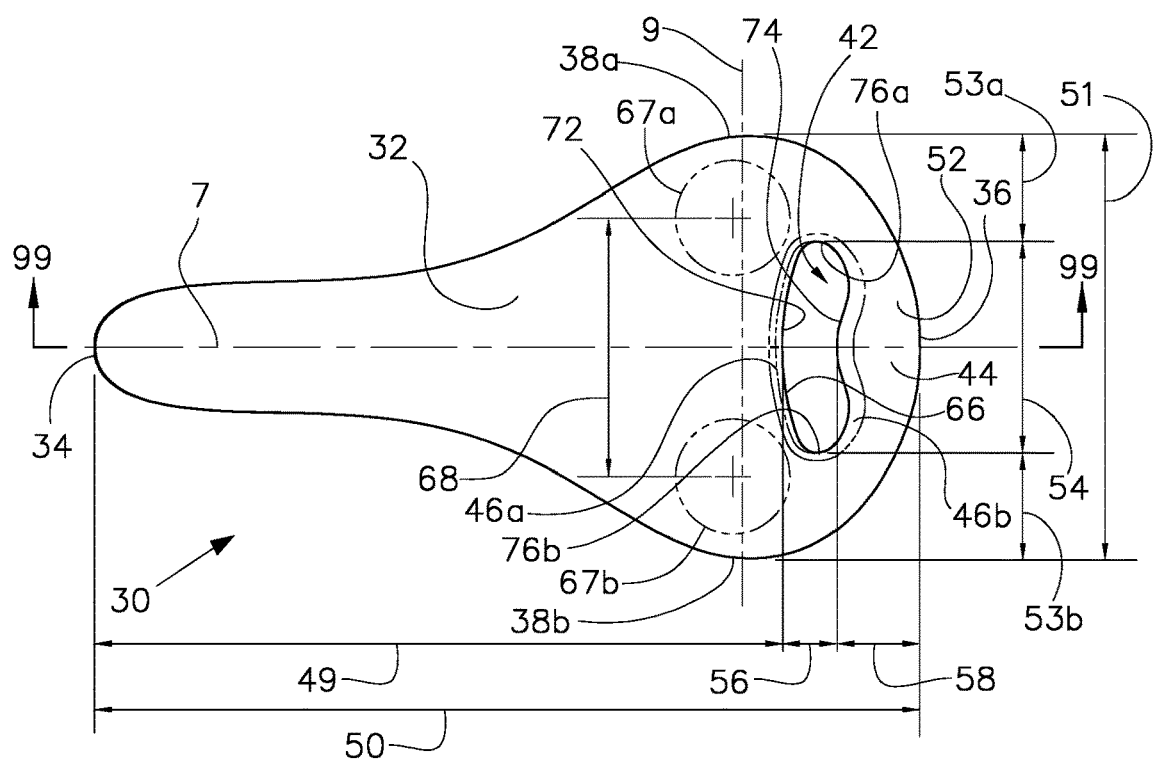
Figure 2C:
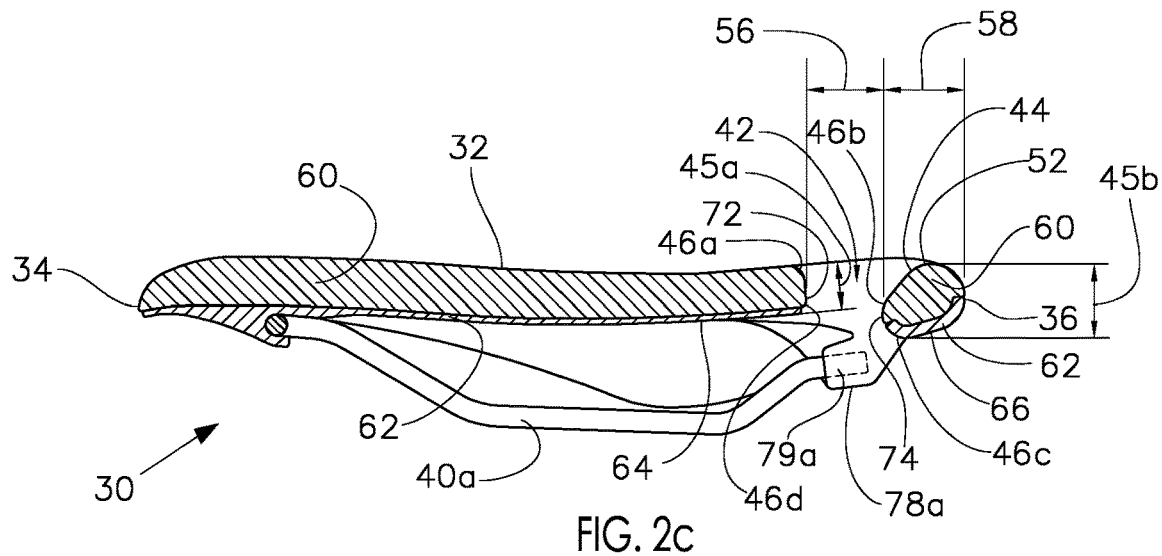
FIG. 2c is a longitudinal cross section view, taken along 99-99 of FIG. 2b.
Figure 2D:
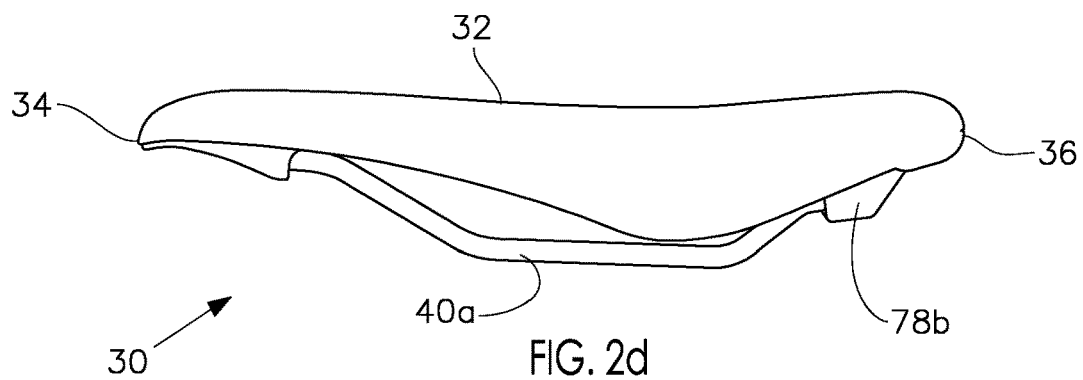
Figure 2E:
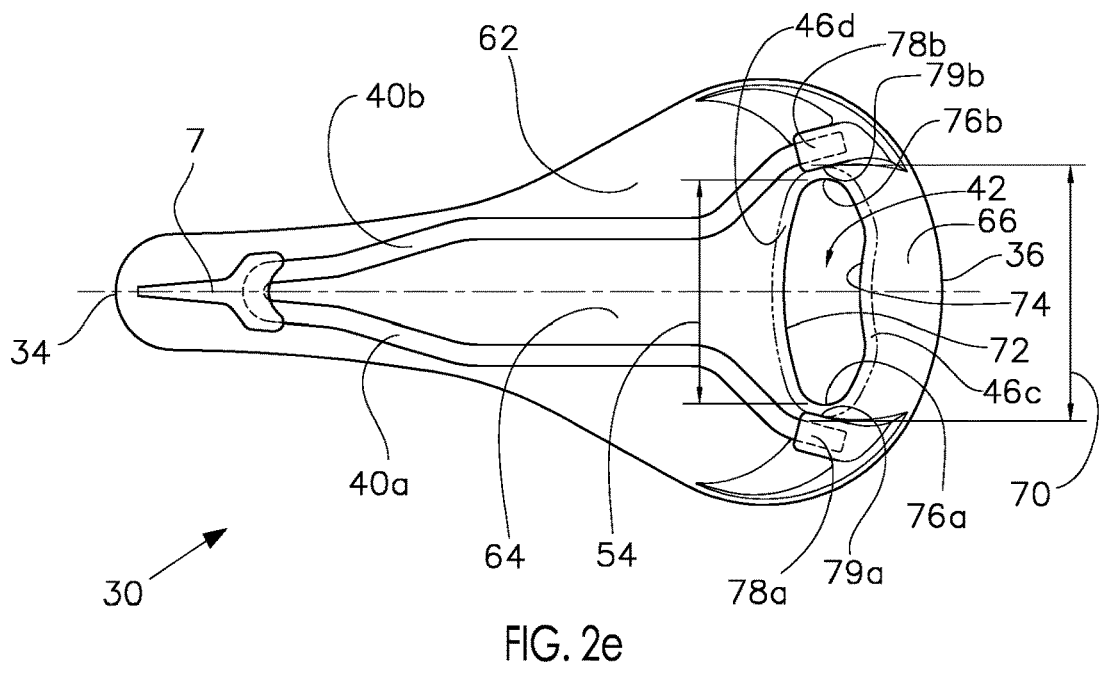

The seat 30 also includes an opening 42 therethrough that pierces the seating surface 32 and extends to communicate with the underside surface 64 (shown in FIGS. 2c and 2e). The opening is generally bounded by a forward periphery 72, a rearward periphery 74 and lateral peripheries 76a and 76b. As particularly shown in FIG. 2b, the opening 42 has a lateral width 54 between lateral peripheries 76a and 76b and a longitudinal length 56 between forward periphery 72 and rearward periphery 74. The seating surface 32 also has lateral widths 53a and 53b between respective lateral ends 38a and 38b and respective lateral peripheries 76a and 76b. When the user is sitting on the seat, the majority of the user's seated weight is supported by the portion of the seating surface 32 directly beneath and adjacent the user's two laterally-spaced ischial tuberosities (i.e. "sit bones"). Sit bone regions 67a and 67b are defined herein as the portion of the seating surface 32 that supports the user's sit-bones and where the contact pressure between the user and seating surface 32 is particularly high. The sit bone regions 67a and 67b are each about twenty five (25) millimeters or more in diameter and are laterally spaced (center-to-center) by sit-bone distance 68. Depending on the anatomy of the user, the sit-bone distance 68 may fall within a range of about ninety (90) millimeters at the narrowest to about one hundred sixty (160) millimeters at the widest.

It is preferable that the seating surface 32 provide a good and consistent supporting surface to the user in these sit-bone regions 67a and 67b, while minimizing or eliminating any localized areas of higher pressure (i.e. pressure points) within sit-bone regions 67a and 67b. It is therefore preferable to position the opening 42 outside of this region to the extent possible and to minimize any abrupt contour transitions or pressure points in this region that may be caused by the opening 42 and/or by the edge or transition surrounding the opening 42.

It is also preferable that the opening 42 be positioned toward the rearward portion of the seat 30 in order that the bridge have a length that can be gripped and that the seating surface 32 may support the user while seated. As such, it is preferable that the ratio of the longitudinal length 49 (between the forward end 34 and the forward periphery 72) and the length 50 to be at least about 3:4.

Further, it is preferable to generally match the lateral width 51 of the seat 30 to the distance 68. A lateral width 51 that is excessively wide in relation to distance 68 may impede the users leg motion when pedaling the bicycle (not shown) and a lateral width 51 that is excessively narrow in relation to distance 68 may not provide sufficient support to the user in the sit-bone regions 67a and 67b. In general, for pedal bicycle use, the minimum preferred lateral width 51 is about one hundred twenty (120) millimeters and the maximum preferred lateral width 51 is about two hundred fifty (250) millimeters. As such, it is preferable that the widths 53a and 53b be at least about twenty five (25) millimeters, and more preferably at least about thirty five (35) millimeters, to provide adequate support in the respective sit bone regions 67a and 67b. It is understood that, while riding, the user tends to shift their body relative to the seat 30 and that the user's sit bone position may shift relative to the predicted sit bone regions 67a and 67b. It is also understood that a given seat will likely be designed to accommodate several users having a range of sit bone distances. Therefore, it is preferable to accommodate for this variation in sit bone position by increasing the size of the sit bone regions 67a and 67b and/or by increasing lateral widths 53a and 53b from the minimum corresponding dimensions. Further, in order to provide sufficient seating area to adequately support the user while seated on the seat 30, it is further preferable that the ratio of the lateral width 51 to the opening width 54 be at least about 1.8:1, or more preferably between about 1.9:1 and about 3.5:1.

It is an objective to optimize the dimensions of the opening 42 to provide a seating surface 32 with good support and comfort for the seated user, while also providing good ergonomics for the user's hand while gripping, grasping and/or grabbing the seat 30 when trying to manually lift and/or maneuver the bicycle. It is generally preferable that the width 54 be at least about forty (40) millimeters, or more preferably between about fifty (50) millimeters and about eighty (80) millimeters, and the length 56 be at least about sixteen (16) millimeters, or more preferably between about twenty (20) millimeters and about thirty (30) millimeters. It is also preferable that width 54 be greater than the length 56 to minimize the corresponding void area of the seating surface 32 while also providing good ergonomics with the user's hand. It is also preferable that the width 54 be at least about twice the length 56 or, more preferably, that the width 54 be at least about three times the length 56.

While the peripheries 72, 74, 76a and 76b may have a wide range of shapes and contours, the opening 42 shown in FIGS. 2a-e has a kidney-shaped profile with a convex curved rearward periphery 74, a concave curved forward periphery 72, and generous concave radii at peripheries 76a and 76b respectively. This kidney-shaped profile may provide good ergonomics with the user's hand and fingers when grabbing the seat to lift and/or maneuver the bicycle as described herein. In particular, the concave curved forward periphery has the benefit of providing sufficient longitudinal length of opening 42 in a laterally inward region, while also allowing for sufficient seating surface 32 area to support the user's sit bones in a laterally outward region.

It is preferable to maximize the length 56 of the opening 42 to provide sufficient clearance for the user's hand and fingers, particularly at a laterally inward region, while minimizing the length 56 to provide sufficient seating surface 32 area at laterally outward sit-bone regions 67a and 67b. As such, it may be preferable that the forward periphery 72 have a concave periphery profile as shown. This allows the laterally inboard portion of opening 42 to have greater length 56 without impinging on these sit-bone regions 67a and 67b.

By piercing the seat 30 with opening 42, a bridge 44 is created in the region longitudinally rearward of the opening 42, between the opening 42 and the rearward end 36. The bridge 44 has a lateral width corresponding to width 54 and a longitudinal length 58. This bridge 44 may serve as a grab handle for the user's fingers and hand when grasping the seat to lift and/or maneuver the bicycle. As such, it is preferable that the longitudinal length 58 be at least about ten (10) millimeters, or more preferably at least eighteen (18) millimeters, and less than about fifty (50) millimeters, for optimal ergonomics.

The peripheral contour of the seat 30 adjacent the rearward end 36 is shown here to have a convex curved profile that provides good ergonomics with the user's hand and fingers when grabbing the seat to lift the bicycle as described herein. However, this contour may alternatively have a flat or concave curved profile, depending on desired aesthetics and/or ergonomics.

The bridge 44 has an upper surface 52 that may be considered as part of the overall seating surface 32 of the seat 30. The upper surface 52 may be contoured to be generally flush with the remainder of the seating surface 32 as shown in FIGS. 2a-e. The upper surface 52 may alternatively be contoured to be raised or lowered relative to the remainder of the seating surface 32. As shown in FIG. 2c, the bridge 44 has an upper surface 52 that is generally flush and generally at the same height as the remainder of the seating surface 32. Bridge 44 also includes an underside surface 66 below and opposed to the upper surface 52.

The opening 42 may provide several options for the user to grip, grasp and/or grab the seat to lift and/or maneuver the bicycle. A first option is for the user to wrap their hand around the rearward end 36 of the seat 30 with their finger(s) extending upwardly into (or through) the opening 42, thereby using the bridge 44 as a grab handle. A second option is for the user to extend their fingers downwardly through the opening 44 and hooking their fingers around the underside surface 64 forward of the opening 42. A third option is for the user to extend their fingers downwardly through the opening 44 and hook their fingers around the underside surface 66 rearward of the opening 42. A wide range of alternate gripping, grasping and/or grabbing options are also possible.

The transition between the seating surface 32 and the opening 42 preferably includes "softened" edges 46a and 46b such as an obtuse bevel (such as a chamfer) or the generous radius (greater than about four (4) millimeters) as shown in the figures. It is also preferred that this softened transition meets the forward periphery 72, rearward periphery 74 and/or lateral peripheries 76a and 76b at a point about four (4) millimeters below the adjacent portion of the seating surface 32. This provides a comfortable and ergonomic interface with the user while he/she is sitting on the seating surface 32 and minimizes the possibility that the user may snag their clothing and/or their skin on the opening 42. This further provides a comfortable and ergonomic interface with the user while extending their hand and/or fingers through the opening 42 to grasp the seat 30. These softened edges 46a and 46b are also preferably included at the transition between the opening 42 and the underside surface 64, again providing a comfortable and ergonomic interface with the user while extending their hand and/or fingers through the opening 42 while grasping the seat 30. It is preferred that this transition meets the forward periphery 72, rearward periphery 74 and/or lateral peripheries 76a and 76b at a point about four (4) millimeters above the adjacent portion of the underside surface 64.

These softened edges are in contrast to sharp or square geometry transitions having minimal radius (less than about three (3) millimeter radius), which create pressure points at the user interface when seated and/or grasping and detract from the comfortable and ergonomic interfaces provided by the aforementioned softened edges. The sharp or square transitions are also more prone to snag the user's clothing and/or skin.

It is also preferable that the periphery of the opening 42 have a softened contour that may preferably include a generous radius at any corner or transition in periphery profile. This softened contour may include a generous radius adjacent lateral peripheries 76a and 76b. As shown in FIGS. 2b and 2e, the lateral peripheries have a full radius. It is preferred that such radii be at least about seven (7) millimeters. These softened contours provide maximum comfort to the user when seated on the saddle 30 and/or when gripping and grasping the saddle with their hand as described herein.

As shown in FIG. 2c, the seat 30 is commonly composed of a support shell 62 of relatively rigid material to provide structural support for the seating surface 32, and a resilient padding 60, such as, but not limited to, a cellular foam material, that is positioned on top of the support shell 62 for comfort of the user while seated. The upper surface of the padding 60, which may be covered by a thinner leather or synthetic covering, creates the seating surface 32. It is preferable that the bridge 44 also include resilient padding in the upper surface 52 region of the seating surface 32 to provide maximum comfort to the user. It is further preferable that the padding 60 extend over the entire seating surface 32 (including upper surface 52) to minimize any hard regions or transitions that may cause discomfort to the user. It is also preferable that the support shell 62 extend to provide structural support for the bridge 44 as shown in FIG. 2c. The saddle rails 40a and 40b are preferably connected to the support shell 62 to provide structural support to the seat 30 and to provide a site for connection with a seatpost (not shown).

As shown in FIG. 2e, saddle rails 40a and 40b connect to the support shell 62 at two laterally spaced anchor points 78a and 78b respectively, each with respective laterally inward surfaces 79a and 79b. Since these anchor points 78a and 78b may straddle the opening 42, it is preferable that the laterally inward surfaces 79a and 79b be laterally coincident or laterally outward of the respective lateral peripheries 76a and 76b to minimize any restriction or encroachment to the users hand when accessing the opening 42 as described herein. It is further preferable that the laterally inward surfaces 79a and 79b be laterally spaced by a dimension 70 that is equal to or greater than the width 54 of opening 42.

As shown in FIG. 2c, the seat 30 includes an underside surface 64 below and opposed to the seating surface 32. There is a thickness 45a between the seating surface 32 and the underside surface 64 forward of the opening 42 and a thickness 45b between the upper surface 52 and the underside surface 66. It is preferable that thicknesses 45a and 45b be at least about four (4) millimeters to minimize any pressure points or sharp edges that may detract from the ergonomics or may cause discomfort to the user's hand when lifting and/or maneuvering the bicycle as described herein. Further, a certain minimum dimension of thicknesses 45a and 45b are required in order to accommodate the geometry of the aforementioned "softened" edges. As such, it is further preferable that thicknesses 45a and 45b be at least about six (6) millimeters or more preferably about ten (10) millimeters to accommodate sufficient padding for user comfort in the region adjoining the seating surface 32 surrounding the opening.

Figure 3:
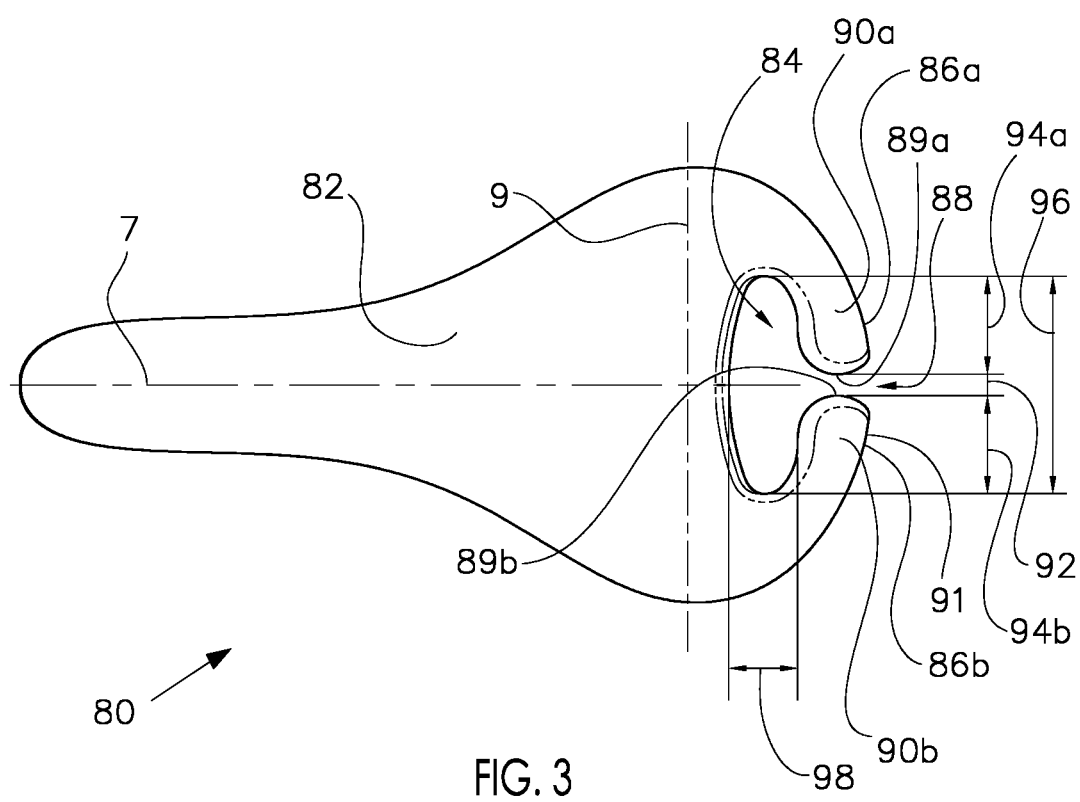
FIG. 3 is an orthogonal top view of a second embodiment of the present invention, corresponding to the view of FIG. 2b, showing a split bridge with a gap therein.

The embodiment of FIG. 3 is similar to the embodiment of FIGS. 2a-e with the exception that the bridge is split to include two bridge arms 86a and 86b with a gap 88 therebetween. The seat 80 also includes an opening 84 therethrough that pierces the seating surface 82 to communicate with the underside surface (not shown). The opening 84 has a lateral width 96 and a longitudinal length 98 and is schematically similar to opening 42 of FIGS. 2a-e with the exception that it includes a longitudinally-extending gap 88 to communicate with the rearward surface 91 of the seat 80.

By piercing the seat 80 with opening 84 and gap 88, two bridge arms 86a and 86b are created in the region longitudinally rearward of the opening 84. The gap 88 has a lateral width 92 between laterally inward peripheries 89a and 89b and the bridge arms 86a and 86b have lateral widths 94a and 94b respectively. As shown in FIG. 3, bridge arms 86a and 86b are anchored at their laterally outboard ends to the remainder of the seat 80 and extend laterally inwardly therefrom to their respective laterally inward peripheries 89a and 89b. These bridge arms 86a and 86b correspond to bridge 44 and may similarly serve as a grab handle for the user's fingers and hand when grasping the seat to lift and/or maneuver the bicycle as described in FIGS. 2a-e.

The bridge arms 86a and 86b have respective upper surfaces 90a and 90b that may be considered as part of the overall seating surface 82 of the seat 80. The upper surfaces 90a and 90b may be contoured to be generally flush with the remainder of the seating surface 82 as shown. The upper surfaces 90a and 90b may alternatively be contoured to be raised or lowered relative to the remainder of the seating surface 82.

Figure 4A:
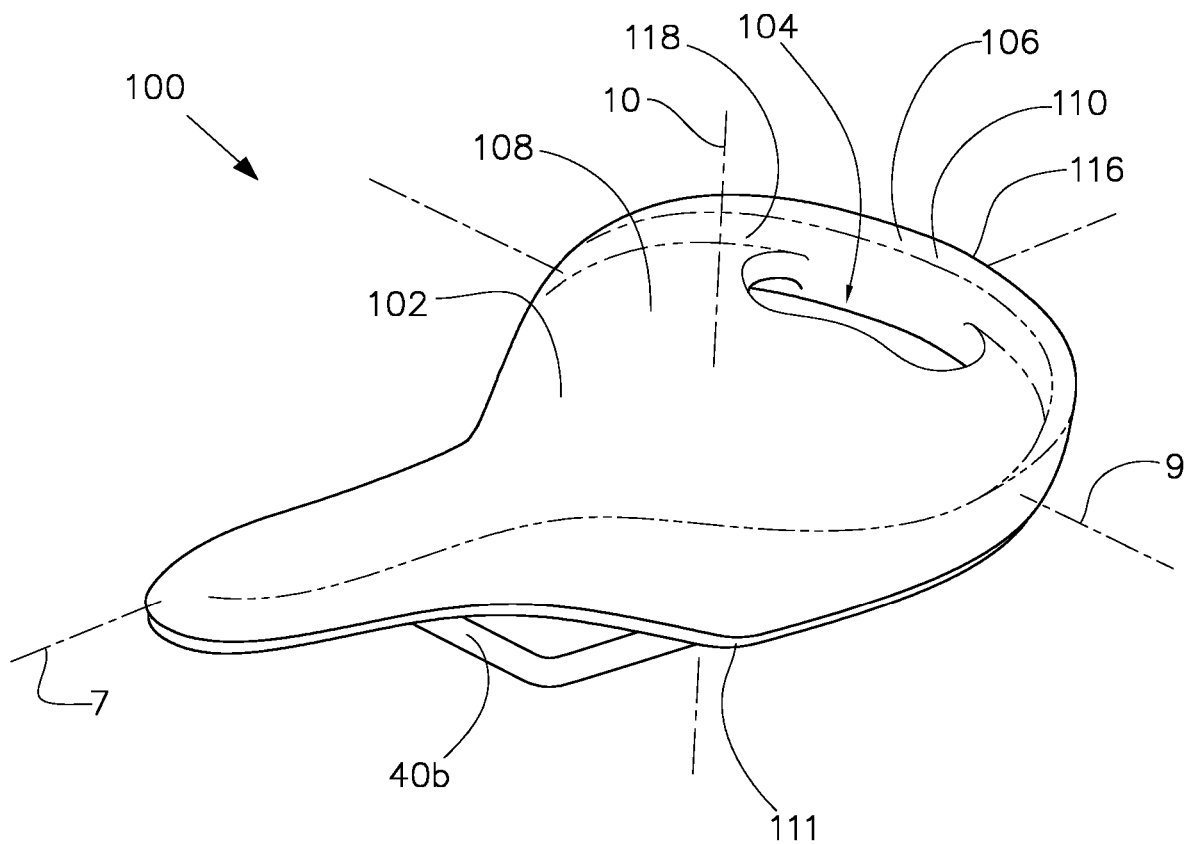
FIG. 4a is a perspective view of a third embodiment of the present invention, showing the bridge with a raised upper surface relative to the base seating surface.

While the embodiment of FIGS. 2a-e shows the upper surface 52 to be generally flush with the remainder of the seating surface 32 as shown, the upper surface 52 may alternatively be contoured to be vertically raised or lowered relative to the remainder of the seating surface 32. The embodiment of FIGS. 4a-b is similar to the embodiment of FIGS. 2a-e with the exception that the upper surface 110 of bridge 106 is vertically raised relative to the base seating surface 108 and the seat 100 includes an upswept surface 118 adjacent the rearward surface 116.

The seat 100 includes seating surface 102 that includes both the base seating surface 108 and the upper surface 110. Rearward surface 116 is the longitudinally rearward periphery of the seat 100. The base seating surface 108 is considered to include the portion of the seating surface 102 that supports the sit bones of the user when the user is sitting on the seat 100. Seat 100 includes an opening 104 therethrough that pierces the seating surface 102 to communicate with the underside surfaces 109 and 117. The opening 104 is schematically similar to opening 42 of FIGS. 2a-e. The seating surface 102 also includes a vertically up-swept surface 118 adjacent the longitudinally rearward surface 116.

By piercing the seat 100 with opening 102 bridge 106 is created in the region longitudinally rearward of the opening 102. The bridge 106 has an upper surface 110 that is contoured to be vertically raised by offset distance 112 relative to the remainder of the base seating surface 108 and is shown to also be contoured to blend with the up-swept surface 118. As shown in FIG. 4b, the bridge 106 also includes an underside surface 117 below and opposed to the upper surface 110, with a vertical bridge thickness 115 therebetween. Bridge 106 corresponds to bridge 44 and may similarly serve as a grab handle for the user's fingers and/or hand when gripping, grabbing, and/or grasping the seat to lift and/or maneuver the bicycle as described in FIGS. 2a-e. The vertically raised orientation of the upper surface 110 may serve to provide an enhanced ergonomic contour of the seating surface 102 and/or may provide an enhanced ergonomic contour of the bridge 106 to interface with the user's fingers and/or hand.

Figure 4B:
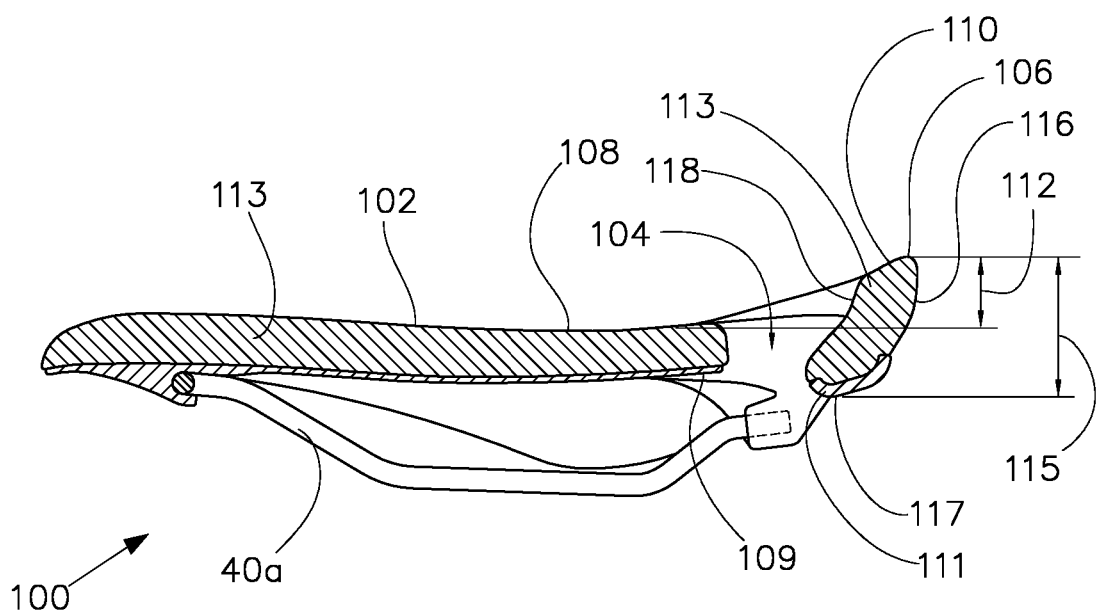
FIG. 4b is a longitudinal cross section view of the embodiment of FIG. 4a, taken through a plane that is defined by the longitudinal axis and the depth axis of the saddle.

As shown in FIG. 4b, the seat 100 is commonly composed of a support shell 111 of relatively rigid material, a resilient padding 113, such as a foam material, that is positioned on top of the support shell 111, and rails 40a and 40b connected to the support shell 111 to add structure to the support shell 111 and provide a mounting geometry for connection with a seatpost (not shown). The support shell provides structural support to the padding 113. The padding 113 may commonly include a leather or synthetic covering (not shown). The seating surface 102, including both the base seating surface 108 and the upper surface 110 of the bridge 106, constitutes the outer and exposed surface of the padding 113 and/or covering and the majority of these surfaces are generally upward-facing. The bridge 106 is also shown to include resilient padding 113. It is further preferable that the padding 113 extend over the entire seating surface 102.

Figure 5A:
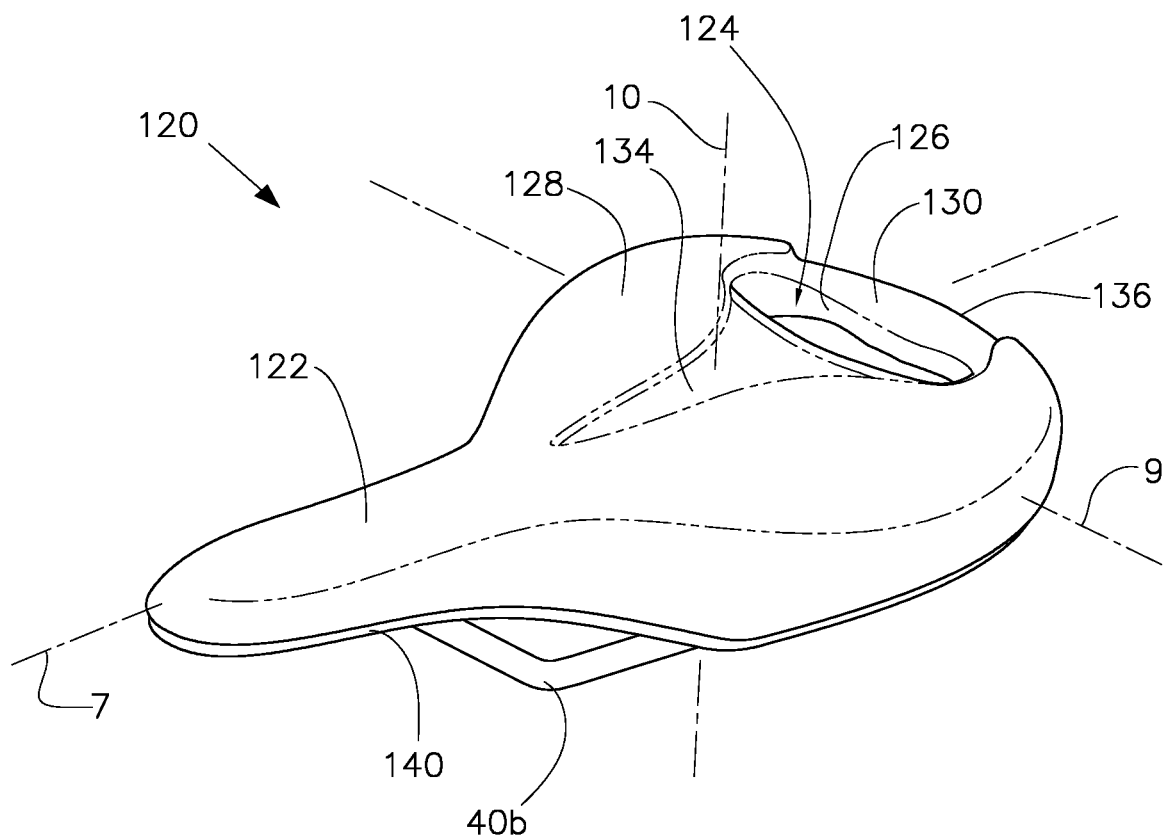
FIG. 5a is a perspective view of a fourth embodiment of the present invention, showing the bridge with a lowered upper surface relative to the base seating surface.

While the embodiment of FIGS. 2a-e shows the upper surface 52 to be generally flush with the remainder of the seating surface 32 as shown, the upper surface 52 may alternatively be contoured to be vertically raised or lowered relative to the remainder of the seating surface 32. The embodiment of FIGS. 5a-b is similar to the embodiment of FIGS. 2a-e with the exception that the upper surface 130 of bridge 126 is vertically recessed and lowered relative to the base seating surface 128.

The seat 120 includes seating surface 122 that includes both the base seating surface 128 and the upper surface 130. Rearward surface 136 is the longitudinally rearward periphery of the seat 120. The base seating surface 128 is considered to include the portion of the seating surface 122 that supports the sit bones of the user when the user is sitting on the seat 120. Seat 120 includes an opening 124 therethrough that pierces the seating surface 122 to communicate with the underside surfaces 138 and 142. The opening 124 is schematically similar to opening 42 of FIGS. 2a-e. The seating surface 122 also includes a vertically recessed contour 134 as is common to reduce pressure on the user's soft tissue.

By piercing the seat 120 with opening 122 bridge 126 is created in the region longitudinally rearward of the opening 122. The bridge 126 has an upper surface 130 that is contoured to be vertically lowered by offset distance 132 relative to the base seating surface 128. As shown in FIG. 5b, the bridge 126 also includes an underside surface 142 below and opposed to the upper surface 130, with a vertical bridge thickness 143 therebetween. Bridge 126 corresponds to bridge 44 (of FIGS. 2a-e) and may similarly serve as a grab handle for the user's fingers and/or hand when gripping, grabbing, and/or grasping the seat to lift and/or maneuver the bicycle as described in FIGS. 2a-e. The vertically lowered and recessed orientation of the upper surface 130 may serve to provide an enhanced ergonomic contour of the seating surface 122 and/or may provide an enhanced ergonomic contour of the bridge 126 to interface with the user's fingers and/or hand.

Figure 5B:
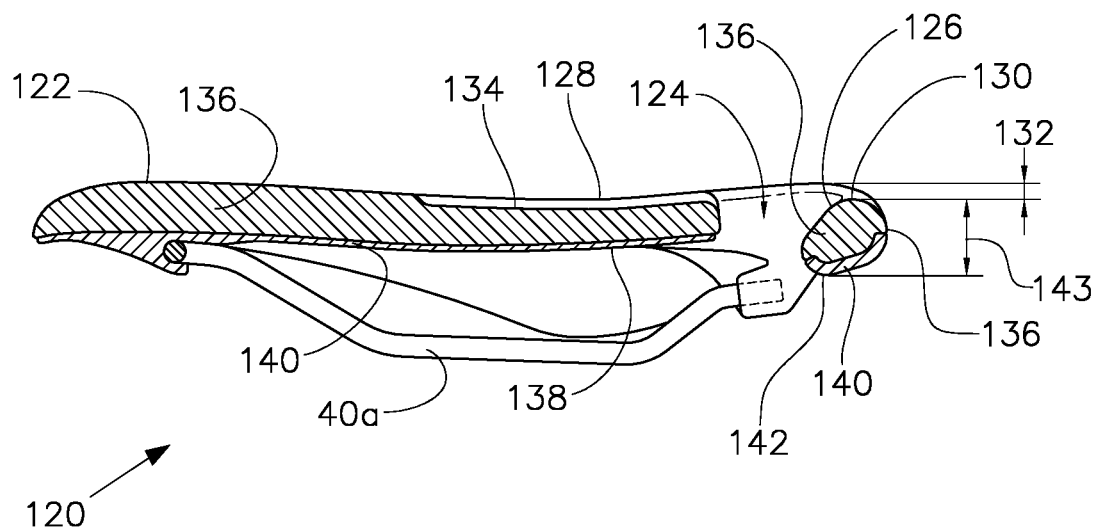
FIG. 5b is a longitudinal cross section view of the embodiment of FIG. 5a, taken through a plane that is defined by the longitudinal axis and the depth axis of the saddle.

As shown in FIG. 5b, the seat 120 is commonly composed of a support shell 140 of relatively rigid material to provide structural support the seating surface 122, including both the base seating surface 128 and the upper surface 130 of the bridge 126, and a resilient padding 136, such as, but not limited to, a foam material, that is positioned on top of the support shell 140 to provide a comfortable seating surface to the user. It is further preferable that the padding 136 extend over the entire seating surface 122, which includes the base seating surface 128 and the upper surface 130. The saddle rails 40a and 40b are preferably connected to the support shell 140 to provide structural support to the seat 120 and to provide a site for connection with a seatpost (not shown).

While the above description contains many specificities, these should not be construed as limitations on the scope of the invention, but rather as exemplifications of embodiments thereof. For example:

While it is most common that the seat includes seat rails (as shown in FIGS. 2a-e) and the seatpost includes facility (not shown) for connecting to the seat rails, there are also a wide range of alternate means for connecting the seat to the seatpost or to the bicycle that may be utilized in a seat of the present invention.

While FIGS. 2a-e, 3, 4a-b, and 5a-b all describe an opening that extends continuously between its lateral peripheries, it is envisioned that the opening may include a longitudinal bridge extending to cross the opening, thus splitting the opening into two (or more) laterally spaced openings. In other words the seat may alternatively include two (or more) laterally spaced openings. In such a scenario, when grasping the bridge, one of the user's fingers may extend through a first opening and another of the users fingers may extend through a second opening. It may be preferable that these two (or more) laterally spaced openings be longitudinally aligned.

Figure 6A:
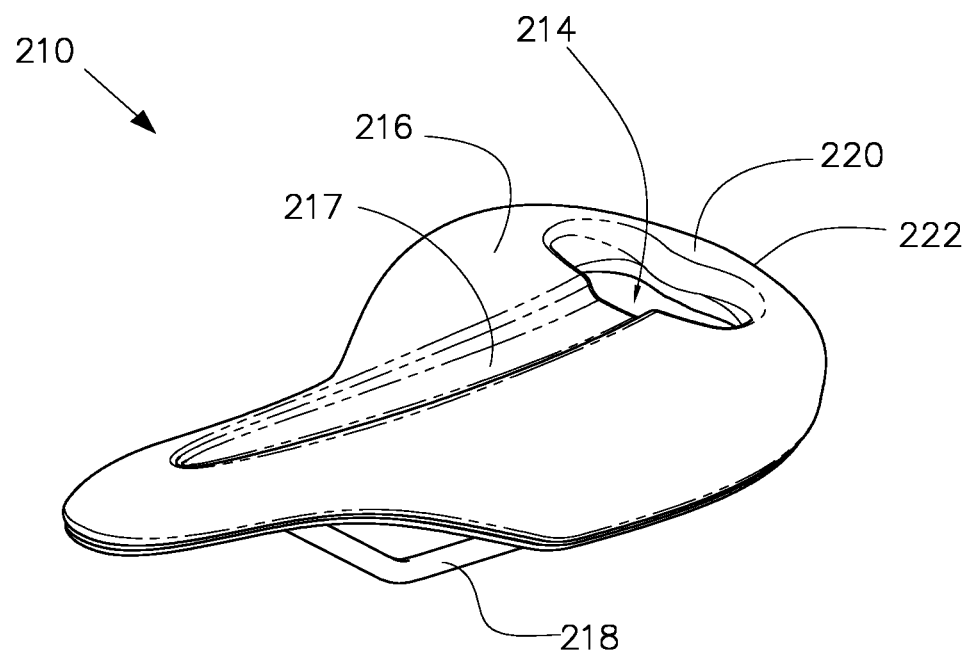
FIG. 6a is a perspective view of a bicycle saddle.

FIG. 6a is a perspective view of another embodiment of the bicycle saddle 210. In this view the through-hole 214 can be seen located near the rear of the saddle 210. Bridge 220 is shown to be longitudinally rearward of opening 214 and is longitudinally rearwardly bounded by rearward end 222 Upper surface 216 serves to contact and support the user. Bridge 220 is shown to have a longitudinal length 213 between the rearward end 222 and opening 214 and a lateral length corresponding to the lateral width 215 of the opening 214. In addition, a portion of the rails 218 can be seen.

Figure 6B:
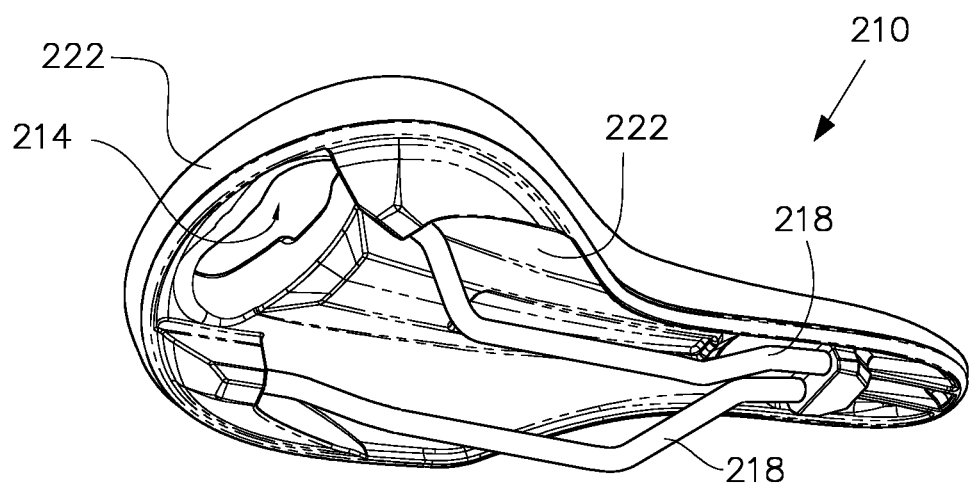

FIG. 6b is a bottom perspective view of the bicycle saddle 210 from FIG. 6a. Support shell 220 is shown to support the seating surface 216 and to provide anchoring connection with the rails 218.

Figure 6C:
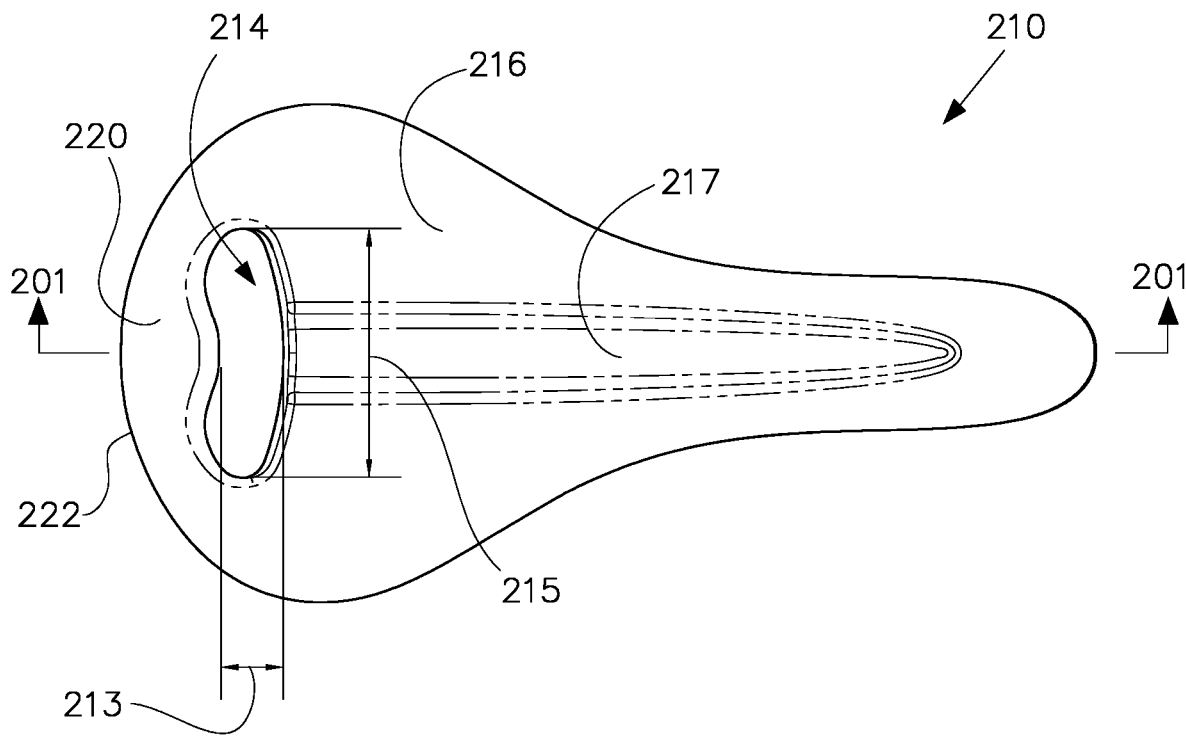

FIG. 6c is a top view of the saddle 210 from FIG. 6a. Recessed channel 217 is shown to provide clearance for the user's soft tissue.

Figure 6D:
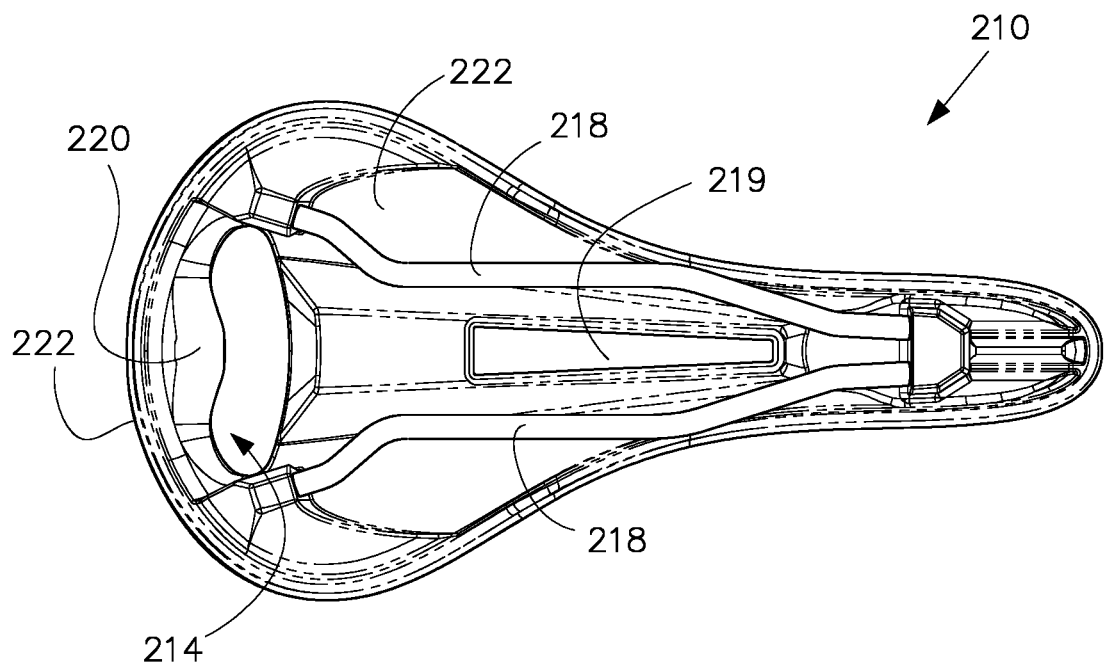

FIG. 6d is a bottom view of the saddle 210 from FIG. 6a. Window 219 is shown as an opening in the support shell 222 to provide additional flexibility and softness to the padding 224 for softer flexure adjacent the seating surface 216.

Figure 6E:
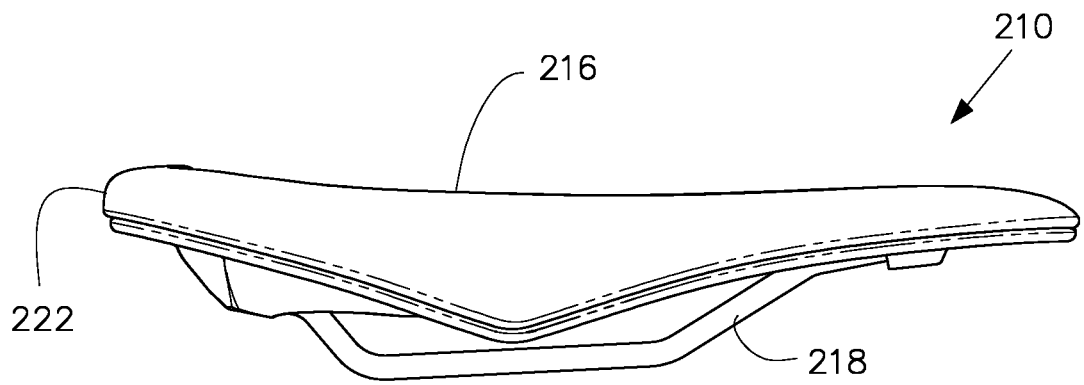

FIG. 6e is a side view of the saddle 210 from FIG. 6a.

Figure 6F:
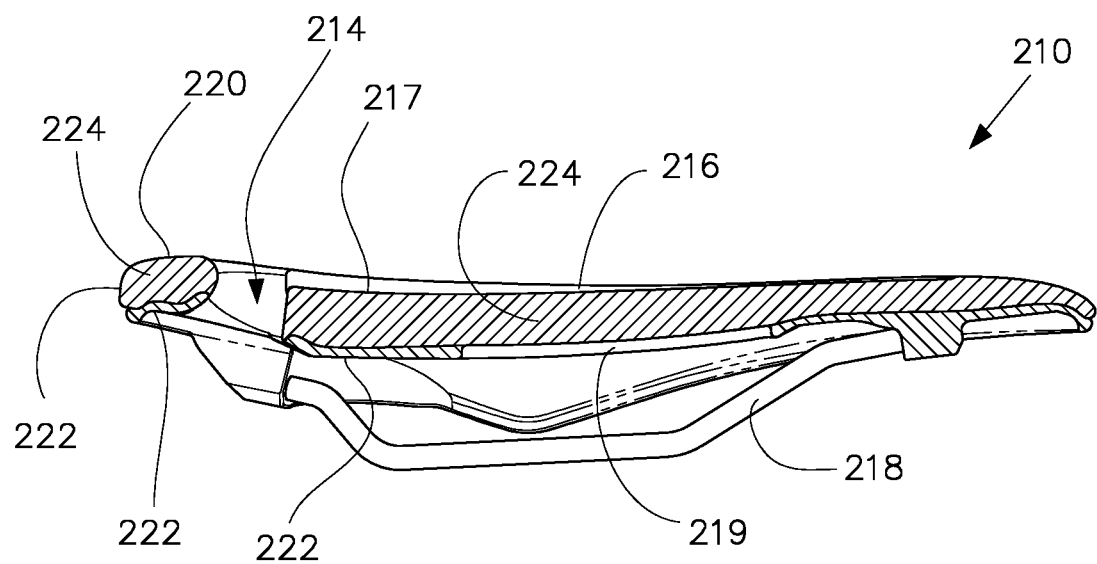
FIG. 6f is a cross section view, taken along 201-201 from FIG. 6c.

FIG. 6f is a cross section view, taken along 201-201 from FIG. 6c. Support shell 222 and padding 224 are both shown to extend to support the seating surface 216 and the bridge 220.

The disclosed through-hole 214 may be incorporated into many different types of bicycle saddles, including but not limited to racing saddles, comfort saddles, cruiser saddles, gender specific saddles, mountain bike saddles, gel saddles, suspension saddles, cutaway saddles, and wide/cushion saddles. In addition, the disclosed through-hole 214 may be incorporated into many different types of saddles for stationary exercise bikes The disclosed saddle has many advantages. The saddle has a through-hole configured to allow a user to use the through-hole to more easily lift the bicycle. The through-hole is forward of the very rear of the saddle, thereby giving the user a more balanced means of lifting the bicycle. The saddle with a through-hole maintains a high level of aesthetic appearance. The through-hole may be configured to be bigger or smaller depending on the size of the user's hands. The disclosed saddle provides a grab handle via the through-hole that is aesthetically pleasing, does not adversely impact the silhouette of the saddle in top or side views. The saddle may provide a grab handle with radius or "softened" contours to minimize pressure points and to minimize and/or eliminate sharp edges that would otherwise cut or pinch the user or snag clothing. The disclosed saddle may provide a generous handle depth and thickness (greater than about 8 mm or preferably greater than about 12 mm or more preferably greater than about 18 mm) to further minimize pressure points and provide improved ergonomics and interface with the user's hand. The disclosed saddle may provide a grab handle that is lightweight with minimal weight penalty in comparison with external grab handles. The disclosed saddle maintains a comfortable seating surface (that does not adversely impact rider comfort). The saddle opening may be positioned outside of and/or between the region of the seating surface that supports the sit-bones and does not interfere with support and/or comfort of the rider. The saddle opening provides a grab handle/bar that is longitudinally forward of the rear edge of seat for improved balance of the bicycle when the bicycle is raised lifted off the ground. The saddle opening forward of the rear of seat helps with the control of the bike weight when lifting. Because grip location is closer to the balance point of the bicycle, the saddle opening reduces pitching when the bicycle is lifted off the ground. By having an opening of sufficient lateral width, the bridge may correspondingly extend laterally for enhanced ergonomics and control when lifting and/or positioning the bicycle. The bridge serves as a laterally extending grab bar, allowing the user to wrap their fingers around for a very secure grip. The disclosed saddle provides resilient cushioning surrounding grab handle for comfort during sitting. The disclosed saddle provides a grab handle of sufficient lateral width to accept (or be hooked by) at least two fingers while maintaining resilient padding at the upper surface of the bridge portion. The lateral opening allows the bridge to extend in a direction generally perpendicular to longitudinal axis, which provides a more ergonomic grab bar and which provides better control of the lateral tilt of bicycle when it is off the ground. The grab bar created by the saddle opening allows a person to accurately control while lifting the weight of a heavy bicycle.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A seat for a bicycle comprising:
   a seating surface having a longitudinal length, a longitudinally forward portion, a longitudinally rearward portion, and a lateral width between a first lateral end and a second lateral end laterally opposed to said first lateral end;
   an underside surface below said seating surface;
   an opening extending from said seating surface to said underside surface, said opening having a periphery thereof;
   wherein the periphery of the entirety of said opening has an opening length between a longitudinally forward periphery and a longitudinally rearward periphery and an opening width between a first lateral periphery and a second lateral periphery laterally opposed to said first lateral periphery;
   wherein said seating surface includes a bridge portion longitudinally located between said opening and said rearward portion of said seating surface;
   wherein said opening has a lateral width greater than its longitudinal length;
   wherein said bridge portion includes resilient padding, such that said seating surface is yieldable and resilient at said bridge portion; and
   wherein the longitudinally forward periphery of said opening is a concave profile such that a laterally outboard portion of said longitudinally forward periphery is longitudinally rearward relative to a laterally inboard portion of said forward periphery.

2. The seat according to claim 1, wherein said opening length is between about sixteen (16) millimeters and about thirty (30) millimeters.

3. The seat according to claim 1, wherein said opening width is between about forty (40) millimeters and about seventy five (75) millimeters.

4. The seat according to claim 1, wherein said seat includes mounting means for mounting to said bicycle, wherein said mounting means is connected to said underside surface at a location that is one of laterally coincident and laterally outward of said opening.

5. The seat according to claim 1, wherein the periphery of the said opening has a generally kidney-shaped profile.

6. The seat according to claim 1, wherein the longitudinally rearward periphery of said opening is a convex profile such that a laterally outboard portion of said longitudinally rearward periphery is longitudinally rearward relative to a laterally inboard portion of said rearward periphery.

7. The seat according to claim 1, wherein the profile of the periphery of said opening has radius corners having a radius of at least about seven (7) millimeters.

8. The seat according to claim 1, wherein a transition between said seating surface and at least a portion of said opening is softened to meet an adjacent periphery of said opening at least about four (4) millimeters below said seating surface.

9. The seat according to claim 1, wherein a transition between said underside surface and at least a portion of said opening is softened to meet the adjacent periphery of said opening at least about four (4) millimeters above said underside surface.

10. The seat according to claim 1, including a thickness depth between said seating surface and said underside surface, wherein said thickness depth at a location adjacent said opening is at least about six (6) millimeters.

11. The seat according to claim 10, including a thickness depth between said seating surface and said underside surface at a location adjacent said opening, wherein said thickness depth is at least about ten (10) millimeters.

12. The seat according to claim 1, wherein said seating surface includes: a base seating surface longitudinally forward of said bridge portion; and an upper surface of said bridge portion; wherein said upper surface is vertically elevated and raised relative said base seating surface.

13. The seat according to claim 1, wherein said seating surface includes: a base seating surface longitudinally forward of said bridge portion; and an upper surface of said bridge portion; wherein said upper surface is generally flush relative to said base seating surface.

14. The seat according to claim 1, wherein said bridge portion is split to include at least one bridge arm, and wherein said opening communicates with said rearward portion.

15. The seat according to claim 1, including a lateral first sit width between said first lateral end and said first lateral periphery, wherein said first sit width is at least about thirty five (35) millimeters.

16. The seat according to claim 15, including a lateral second sit width between said second lateral end and said second lateral periphery, wherein said second sit width is at least thirty five (35) millimeters.

17. The seat according to claim 15, including a lateral second sit width between said second lateral end and said second lateral periphery, wherein both said first sit width and said second sit width are at least about forty two (42) millimeters.

18. The seat according to claim 1, wherein the ratio of said lateral width to said opening width is at least about 1.8:1.

19. The seat according to claim 1, wherein the ratio of said lateral width to said opening width is between about 1.9:1 and about 3.5:1.

20. A seat for a bicycle comprising:
a seating surface having a longitudinal length, a longitudinally forward portion, a longitudinally rearward portion, and a lateral width between a first lateral end and a second lateral end laterally opposed to said first lateral end;
an underside surface below said seating surface;
an opening extending from said seating surface to said underside surface, said opening having a periphery thereof;
wherein the periphery of the entirety of said opening has an opening length between a longitudinally forward periphery and a longitudinally rearward periphery and an opening width between a first lateral periphery and a second lateral periphery laterally opposed to said first lateral periphery;
wherein said seating surface includes a bridge portion longitudinally located between said opening and said rearward portion of said seating surface;
wherein said opening has a lateral width greater than its longitudinal length; and
wherein said seating surface includes: a base seating surface longitudinally forward of said bridge portion; and an upper surface of said bridge portion; wherein said upper surface is vertically recessed and lowered relative said base seating surface.

21. A seat for a bicycle comprising:
a seating surface having a longitudinal length, a longitudinally forward portion, a longitudinally rearward portion, and a lateral width between a first lateral end and a second lateral end laterally opposed to said first lateral end;
an underside surface below said seating surface;
an opening extending from said seating surface to said underside surface, said opening having a periphery thereof;
wherein the periphery of the entirety of said opening has an opening length between a longitudinally forward periphery and a longitudinally rearward periphery and an opening width between a first lateral periphery and a second lateral periphery laterally opposed to said first lateral periphery;
wherein said seating surface includes a bridge portion longitudinally located between said opening and said rearward portion of said seating surface;
wherein said opening has a lateral width greater than its longitudinal length;
wherein said bridge portion includes resilient padding, such that said seating surface is yieldable and resilient at said bridge portion; and
wherein the longitudinally rearward periphery of said opening is a convex profile such that a laterally outboard portion of said longitudinally rearward periphery is longitudinally rearward relative to a laterally inboard portion of said rearward periphery.

* * * * *